(12) United States Patent  
Glenn et al.

(10) Patent No.: US 9,176,797 B1  
(45) Date of Patent: Nov. 3, 2015

(54) WORKFLOW PROCESSING AND METHODS FOR AUDITING AND PLAYBACK OF DATA

(75) Inventors: Kenneth D. Glenn, Olathe, KS (US); Mark A. Holtzclaw, Liberty, MO (US); Alan S. Krause, Fairway, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 952 days.

(21) Appl. No.: 13/360,523

(22) Filed: Jan. 27, 2012

(51) Int. Cl.
*G06F 11/00* (2006.01)

(52) U.S. Cl.
CPC .................................... *G06F 11/006* (2013.01)

(58) Field of Classification Search
CPC .................. G06F 11/006; G06F 17/50; G01N 2291/2694; G01N 2291/2693; G01N 21/954; G01N 2223/646; G01N 2223/631; G01N 23/02; G01N 29/4472; H04L 65/403; H04L 67/12

See application file for complete search history.

(56) References Cited

U.S. PATENT DOCUMENTS

| 7,269,633 | B2* | 9/2007 | Allan | 709/217 |
| 7,328,262 | B2* | 2/2008 | McDonagh et al. | 709/224 |
| 7,653,006 | B1* | 1/2010 | Marino et al. | 370/252 |
| 8,225,011 | B2* | 7/2012 | Soeda et al. | 710/18 |
| 8,738,761 | B2* | 5/2014 | Raisoni et al. | 709/224 |
| 2004/0054715 | A1* | 3/2004 | Cesario | 709/203 |
| 2004/0111488 | A1* | 6/2004 | Allan | 709/217 |
| 2009/0089320 | A1* | 4/2009 | Tendler et al. | 707/102 |
| 2011/0302332 | A1* | 12/2011 | Soeda et al. | 710/18 |

* cited by examiner

*Primary Examiner* — Nadeem Iqbal

(57) ABSTRACT

A method of transaction capture and playback is provided. The method comprises identifying monitored components, wherein monitored components comprise one or more hardware platforms supporting an enterprise service oriented architecture. Configuration states of monitored components are stored. Transaction messages into and out of the monitored components are captured, including timestamps. Responses received from components not being monitored are captured, including timestamps. A sequence of transactions is executed, in sequence and with the same timing as the captured transaction messages, to reproduce and monitor for failures.

20 Claims, 5 Drawing Sheets

WORKFLOW PROCESSING AND METHODS FOR AUDITING AND PLAYBACK OF DATA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Service oriented architecture provides an application framework that turns business applications into individual business functions and integrates processes as linked, repeatable business tasks, or services. Services are designed to be highly reusable and meet the needs of calling applications in the enterprise. Service oriented architecture also provides a way for applications to be aware of available services through the use structured data such as extensible markup language (XML) to describe the services and the data that drives the services.

Enterprise business services serve as a means of accessing backend systems and data in a corporate computing environment. Services wrap one or more backend operations in a single, synchronous transaction and decouple applications from data and from one another. Calling applications are buffered from backend changes and do not need to be aware of the complexity of the services. Services do not retain state information about transactions, once a request has been received from a calling application, processed, and a response has been issued, the service may not retain knowledge that can be used in subsequent transactions.

SUMMARY

In an embodiment, a method of transaction capture and playback is disclosed. The method comprises identifying monitored components, wherein monitored components comprise one or more hardware platforms supporting an enterprise service oriented architecture. Configuration states of monitored components are stored. Transaction messages into and out of the monitored components are captured, including timestamps. Responses received from components not being monitored are captured, including timestamps. A sequence of transactions is executed, in sequence and with the same timing as the captured transaction messages, to reproduce and monitor for failures.

In an embodiment, a method of computer transaction playback verification is disclosed. The method comprises executing a sequence of captured transaction messages, matching the order and time of a plurality of captured messages based on the timestamps of the captured messages. A plurality of state characteristics of the components executing the captured transaction messages is monitored, wherein the components comprise one or more hardware platforms supporting an enterprise service oriented architecture. The timing of the playback of the transactions and the timing of the response messages is verified compared to the timestamps captured. A discrepancy between observed and captured timing or state characteristics is identified and a source of a problem in the enterprise service system is determined based on the identified discrepancy.

In an embodiment, a method of transaction load testing and performance optimization is disclosed. The method comprises executing a sequence of captured transactions, matching the order of the messages as when they were captured while varying the timing of the message playback in order to increase the load on a transaction system while maintaining the timing of response messages based on the captured response timestamps. The method further comprises verifying that the transaction system processes the increased load successfully.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
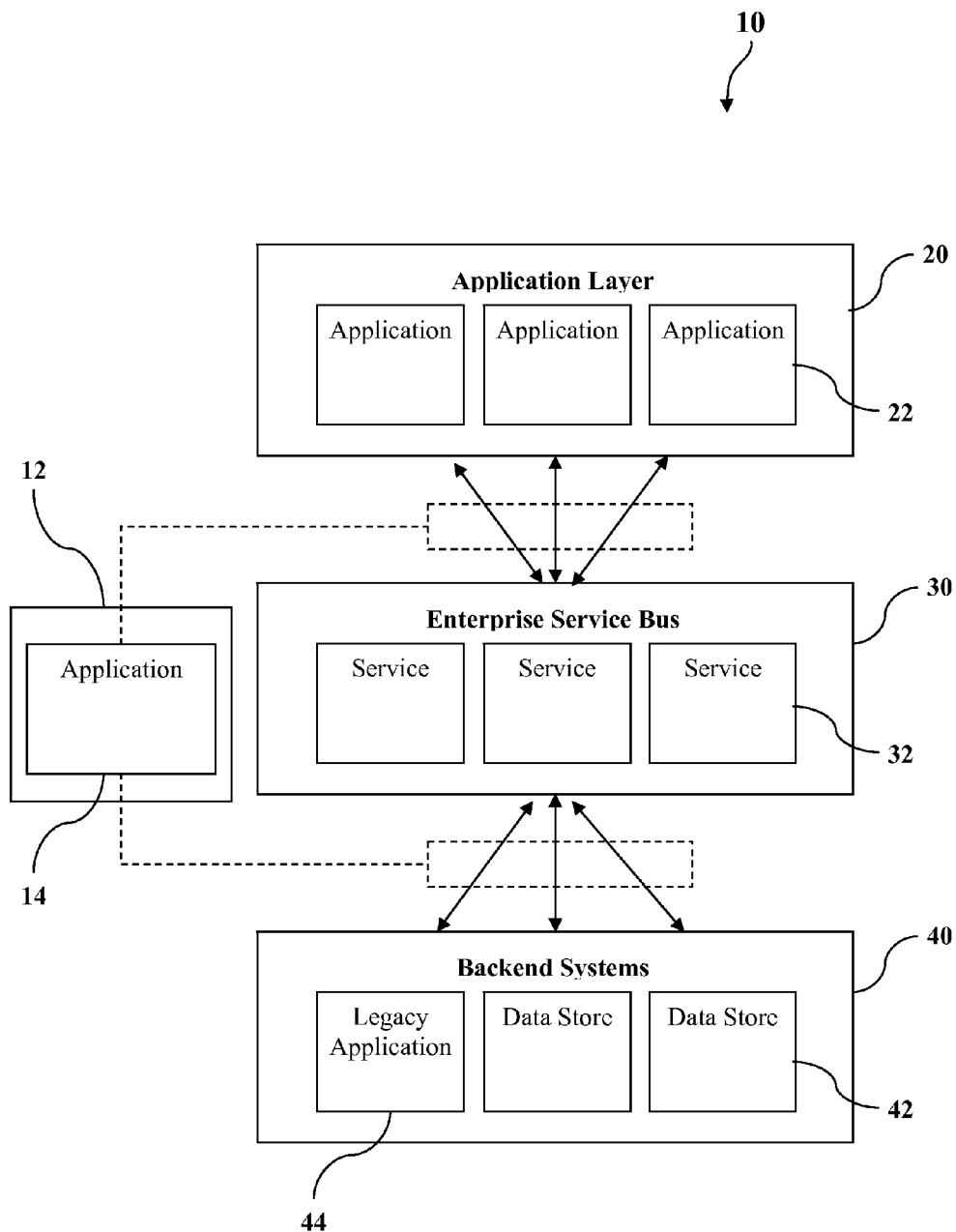
FIG. 1 is a block diagram of a system for managing data communication network inventory according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, the term "transaction" refers to individual, indivisible operations conducted by an application sending a request to a service and receiving a response from the service in an enterprise computing environment. For example, a typical banking transaction that involves transferring funds from a savings account to a checking account is a single operation in terms of the banking function, but involves two separate operations in computer terms: debiting the savings account and crediting the savings account. The transaction of transferring funds is performed by a service which completes the two separate operations before responding that the transaction is completed. If either of the operations fails, both of the operations of the transaction are set back to their original state to ensure there are no inconsistencies in the backend data as a whole.

A system and method of transaction capture and playback is disclosed, providing the ability to record transactions within an enterprise business services system and to reproduce the processing of the transactions by the playback system. Reproducing the processing of the transactions may be referred to as playback and/or playing back the transactions. This system and method may be used to recreate and troubleshoot problems experienced in the actual enterprise business services system as well as to optimize and forecast needed expansion of the enterprise business services system. The system may provide the capabilities to store transaction messages in files ready for immediate playback, along with the ability to determine how many machines process the data that is stored. The system may also store the origin of the transaction messages, characteristics of the data, timestamps, including date and time of when messages enter and leave the system, message sizes, and system resources such as processor utilization, memory utilization, and disk utilization. The system may store configuration information the promotes recreating the execution environment, for example storing server configuration, operating system versions, virtualization software versions, and data store software versions. The system may store data present in a data store so that in performing playback of the recorded transactions, the contents of the data store may likewise be reproduced for the playback. These other stored items that are not transactions may be referred to in some contexts as system state characteristics.

Transaction capture and playback combined with storing the state characteristics of the components executing the transactions provides the ability to return the system components to the state they were in when the transactions were captured. Playback of the captured transactions then allows recreating the environment and results from the original execution of the transactions, providing a repeatable means to reproduce a problem. Not only can the original system be returned to the same state as when the transactions were captured, but the stored information is sufficient to recreate the environment on separate hardware. The stored configuration and captured transactions may even be sent to a vendor, enabling the vendor to recreate a problem using the playback functionality on their own hardware to facilitate finding a solution.

The system additionally provides for accurate load and performance testing based on the real captured transactions as opposed to extrapolation and estimation. By capturing the timestamps along with the transaction messages, the system has the information needed to control the rate at which the transactions are executed. By increasing the rate of the transaction messages, a higher load can be put on the hardware components and the system performance and resource utilization can be monitored. Delays in the system may also be identified and minimized, further optimizing system performance.

Turning now to FIG. 1, an enterprise service system 10 capable of performing transaction capture and playback is described. The enterprise service system 10 comprises a computer 12, an application layer 20, an enterprise service bus 30, and backend systems 40. In an embodiment, the enterprise service system 10 may be a computer based system for flexibly providing computing resources to the application layer 20 or to users of the application layer. In an embodiment, the enterprise service system 10 may be designed at least in part in accordance with the principles of service oriented architecture.

The computer 12 comprises an application 14 for transaction capture and playback. The application 14 also stores configuration data for the hardware platforms comprising the application layer 20, enterprise service bus 30, and backend systems 40 to be used to replicate the environment during playback. The application 14 also stores the contents of data stores that may be used by the enterprise service system 10. The application 14 may comprise a plurality of applications and/or components. The application layer 20 comprises a plurality of applications 22 for communicating with the backend systems 40 through the enterprise service bus 30. The applications 22 provide the functionality for users to access the backend systems and data they contain. Examples of applications 22 are call center applications, desktop applications, customer portals, and partner applications. The applications 22 communicate with the enterprise service bus 30 using standard methods such as hypertext transport protocol (HTTP) and message queues.

The enterprise service bus 30 is designed to support transaction management and data transformation between the backend systems 40 and calling applications 22. The enterprise service bus 30 comprises a plurality of services 32 which serve as the primary means of accessing backend systems 40 and enterprise data to support a single version of the data across the enterprise regardless of the application 22 or method of access. The services 32 are designed to be highly reusable and should meet the needs of most calling applications 22. The services 32 communicate with the backend systems 40 using the interface technologies provided by the backend systems 40 and may use direct database access, hypertext transfer protocol, message queues, or application programming interface (API) calls to communicate. The enterprise service bus 30 may transform data between the communication format of the application 22 and the backend systems 40.

The backend systems 40 comprise a plurality of data stores 42 and a plurality of legacy applications 44. The enterprise data is stored in these backend systems 40 and is made accessible through the enterprise service bus 30 to the applications 22. The service oriented architecture of the enterprise service system 10 allows access to the enterprise data in a reliable, secure manner without requiring knowledge of application specific data models of the backend systems 40.

The architecture of the enterprise service system 10 provides the framework for the capture and playback of transactions by the application 14 and the ability to monitor at touch points throughout the enterprise network. Touch points may be input and output points of different systems and/or applications. Transaction messages may be stored in files by the application 14 as they are received by a service 32 along with a timestamp. Likewise when the transaction leaves the service 32 after manipulation a copy of the manipulated transaction may be stored in the files by application 14. As an example, the next touch point for the transaction leaving the service 32 might be a message queue, and if desired, the transaction playback could start from there. This flexibility allows starting the transaction playback from any touch point in the enterprise service system 10. In other words, the behavior of the enterprise service system 10 can be viewed during playback from any touch point, as desired.

The enterprise service system 10 architecture also allows for internal and external access of transactions as necessary for playback for problem recreation. Based on the access point of the requesting application 22, the captured transactions and state characteristic data may be encrypted. If the captured data is being accessed by a vendor from a network external to the enterprise service system 10, data integrity and protection would be of concern, and the data could be encrypted to be decrypted by the vendor upon receipt. If the data is being accessed internally there would be no need for encryption. This enables a secure method for a vendor to reproduce a problem by executing captured transactions on their own hardware.

Figure 2:
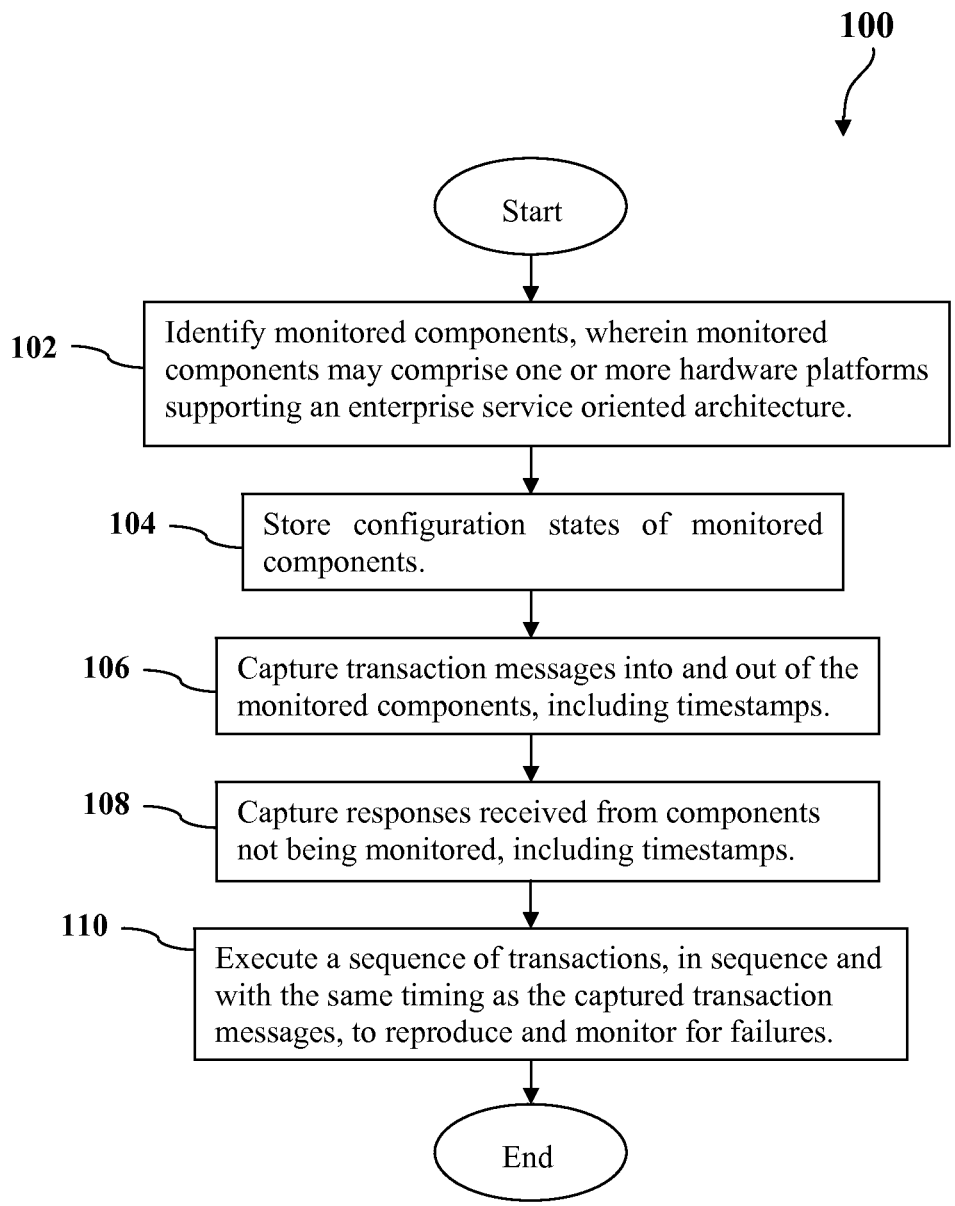
FIG. 2 is a flow chart of a method of managing data communication network inventory according to an embodiment of the disclosure.

Turning now to FIG. 2, a method 100 of transaction capture and playback is described. At block 102, monitored components are identified, where monitored components may comprise one or more hardware platforms supporting an enterprise service oriented architecture. Hardware platforms may include purpose-built appliances comprised of processors, memory, and hard drives tailored to simplify, secure and accelerate services deployed in the enterprise. The monitored components provide touch points in the enterprise where transaction messages may be captured. At block 104, configuration states of the monitored components are stored. The configuration states may comprise system resources such as processor, memory, and disk utilization, running processes, and network usage associated with the monitored components. The configuration or hardware devices and software versions may be stored, for example the configuration of servers, the version or release number of operating system software, the version or release number of virtualization software, the version or release number of messaging software, the version or release number of data store software. The contents of data stores may be stored.

At block 106, transaction messages into and out of the monitored components are captured, including timestamps. Capturing the transaction messages into and out of the monitored components with timestamps provides the data needed to recreate system activities at a given point in time. At block 108, responses received from components not being monitored are captured, including timestamps. The responses received also provide data that may be useful in recreating system activities and may point to other areas of the system introducing service delays.

At block 110, a sequence of transactions is executed, in sequence and with the same timing as the captured transaction messages, to reproduce and monitor for failures. Utilizing the captured transaction messages, the exact system conditions may be replicated by executing the same sequence of transactions with the same timing. It is noted that there may be significant, telling differences between the captured transaction messages and any pseudo-real set of transaction messages, for example a pseudo-real set of test transaction messages. Computers and software are stateful. The behavior of a computer and/or software executing on the computer going forwards from a given point depends in complex ways on the state of the computer and the software at the given point, and that state is a complex result of what has happened before. The state arrived at by processing a sequence of actual captured transactions may be different from the state arrived at by processing a sequence of pseudo-real set of transactions, for example a set of transactions that are created for testing purposes, possibly by automatically generating typical transactions.

The captured transactions may be executed on the original hardware environment or on a duplicate environment on separate hardware. This may reduce the amount of time it takes to reproduce a problem and allow improved troubleshooting to identify and resolve the issue. For example, an error which occurs during a period of heavy usage or that is not discovered quickly may make finding the root cause difficult. Executing transactions captured during the time leading up to the error allows the monitoring of the system while recreating the problem. The cause of the error can be identified and a fix implemented based on the ability to focus on the events taking place as the problem occurs.

In an embodiment, storing configuration states comprises copying the state of the hardware, data base schema, resource utilization and system logs to storage arrays. A storage array is a disk storage system typically using redundant components and hard disks to eliminate single points of failure in the storage array. Storing configuration states to storage arrays provides the ability to capture a snapshot of the monitored components. This snapshot can be used by an application 14 to return the monitored components to the state they were in when the transactions were captured to help reproduce conditions that led to a failure. In an embodiment, capturing transaction messages comprises copying the message with timestamp, message headers and service payload to storage arrays. Message headers comprise application specific information about the transaction, such as authentication information or encryption. The service payload comprises the body of the transaction message intended for the ultimate endpoint of the message. In order to playback the transactions at a later time, all portions of the transaction messages will be stored to storage arrays. Additionally, including the timestamps will provide the ability to determine the timing of the transaction messages and to match the sequence and timing on playback by the application 14.

In an embodiment, the speed of transaction playback may be varied by the application 14 to facilitate problem identification and troubleshooting. Varying the speed of transaction playback can assist in problem identification by changing the way the system reacts to the playback. For example, speeding up the transaction playback may reproduce the problem more quickly. Slowing down the transaction playback may help when monitoring components to recognize events leading up to the failure to aid in identifying the problem. In an embodiment, the method 100 further comprises rebuilding the captured configuration on separate hardware using the stored configuration states and playing back the captured transaction messages. The stored configuration states may be used to ensure the separate hardware is configured to match the captured configuration and that playing back the captured transaction messages provides the same results as seen on the monitored components. For example, to insure that the operating system software is the same version used in the original system, that the virtualization software is the same version used in the original system, that the data store contents is the same as the contents of the data store in the original system, that the servers have the same hardware setup as the servers in the original system.

In an embodiment, the separate hardware used to rebuild the captured configuration is located remotely. The ability to capture transaction messages and state characteristics of the system provides the means to recreate the system environment on separate hardware. Providing access to this captured data from a remote location may allow recreating the system environment on hardware located at the remote location. This may be useful when requesting vendor support to troubleshoot the problem. The vendor would be able to configure their hardware to match the monitored system components where the transactions were captured, and could then playback the exact transactions with the exact timing to reproduce the problem. In an embodiment, the stored configuration states and captured transactions are encrypted for remote access. Security and data integrity would be a concern with a vendor remotely accessing the captured data, so the data may be encrypted for protection. The vendor may then decrypt the data for playback after it is transferred to the remote system.

In an embodiment, the method 100 further comprises emulating response messages with actual response times from the captured responses. By emulating the response messages, playing back the captured transaction messages can be done without connectivity to the backend data stores. This allows reproducing the transaction execution while consuming fewer resources in the system. The use of actual response times ensures the emulated responses do not introduce any change from the captured responses. In an embodiment, the speed of response message playback can be controlled to facilitate problem identification and troubleshooting. In some cases it may be beneficial to change the timing of the response message playback. For example, increasing speeds of the transaction playback and response message playback together may reproduce a problem more quickly, helping to speed problem identification.

In an embodiment, the enterprise service oriented architecture is implemented as a web service. Web services make functional operations and data accessible over standard Internet protocols. These services can represent new applications or wrap around existing legacy applications, providing a standard interface to the legacy applications. Web services messages may use standard protocols such as simple object access protocol (SOAP) and extensible markup language (XML).

Figure 3:
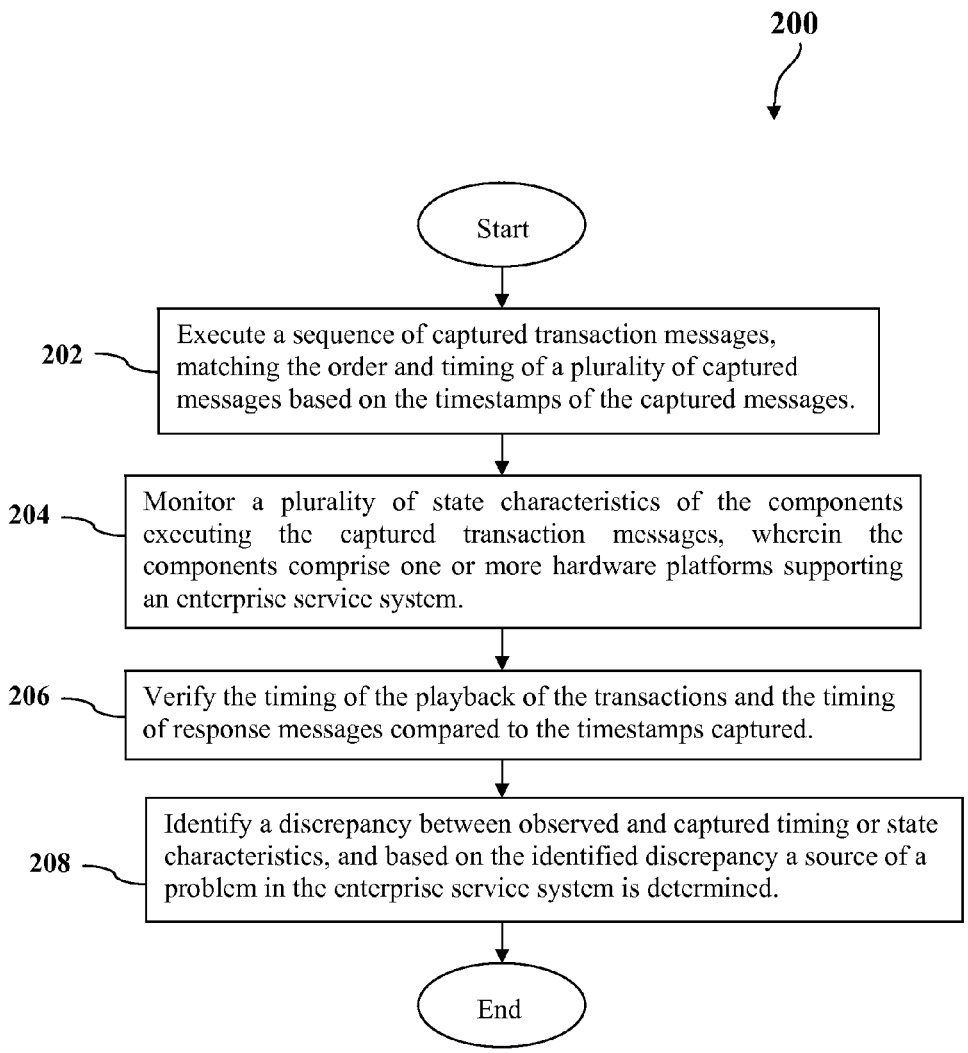
FIG. 3 is a flow chart of a method managing data communication network inventory according to an embodiment of the disclosure.

Turning now to FIG. 3, a method 200 of computer transaction playback verification is described. At block 202, a sequence of captured transaction messages is executed, matching the order and timing of a plurality of captured messages based on the timestamps of the captured messages. Executing the transaction messages in the same order and timing as when they were captured allows the system to be observed under the same conditions as when the transaction messages were first captured. At block 204, a plurality of state characteristics of the components executing the captured transaction messages are monitored, where the components comprise one or more hardware platforms supporting an enterprise service system, for example the enterprise service system 10 described above. Monitoring characteristics such as the processor utilization and memory utilization of the components executing the transaction messages may allow identification of system changes during the transaction playback. At block 206, the timing of the playback of the transactions and the timing of response messages is verified compared to the timestamps captured. The time differentials between the message playback and the captured messages are expected to be comparable, and the performance of the transaction playback may be expected to mirror the original transaction performance. At block 208, a discrepancy between observed and captured timing or state characteristics is discovered, and based on the identified discrepancy, a source of a problem in the enterprise service system 10 is determined. For example, a problem first experienced in the enterprise service system 10 is reproduced and a source or cause of the problem source is identified. A difference between the transaction timing may show a problem with the playback, while a change in the state characteristics may show an issue with the system configuration. When the source of the problem is identified, the problem may be fixed. For example, an operating system may be changed to the appropriate version, a virtualization software application may be changed to the appropriate version, configuration settings may be changed to the appropriate values, and other adjustments or corrections may be performed.

As an example, executing a sequence of captured transaction messages results in the timing of the playback of the transactions being verified to match the timing of the captured messages, however the timing of the response messages shows a discrepancy from the captured response messages. A review of the system configuration reveals that one of the hardware components is configured incorrectly, slowing transaction processing. Correcting the configuration issue brings the environment back to the state when the transaction messages were captured, and repeating the execution of the captured transaction messages results in successful verification of the timing of the transaction playback and the timing of the response messages compared to the captured timestamps.

In an embodiment, monitoring the state characteristics of the components comprises monitoring the configuration and resource utilization of the components. The configuration of the monitored components is important for recreating the system environment when playing back the transactions. To expect the same results when executing the playback of the captured transactions, the system needs to be configured in the same manner as when the transactions were captured. This applies whether the playback is being executed on the same system or on separate hardware. The resource utilization is also important to monitor for differences between the utilization when the transactions were captured and the utilization during playback. Discrepancies may denote an issue with the configuration or may point to the source of a problem being recreated.

In an embodiment, the sequence of captured transaction messages may be started from a specific point in time for playback. Utilizing the stored timestamps on the transaction messages allows choosing a specific date and time of the captured transaction messages and the playback will start from that point in time until instructed to stop. This may provide the ability to narrow the window of captured transactions executed to isolate a problem identified during verification.

Figure 4:
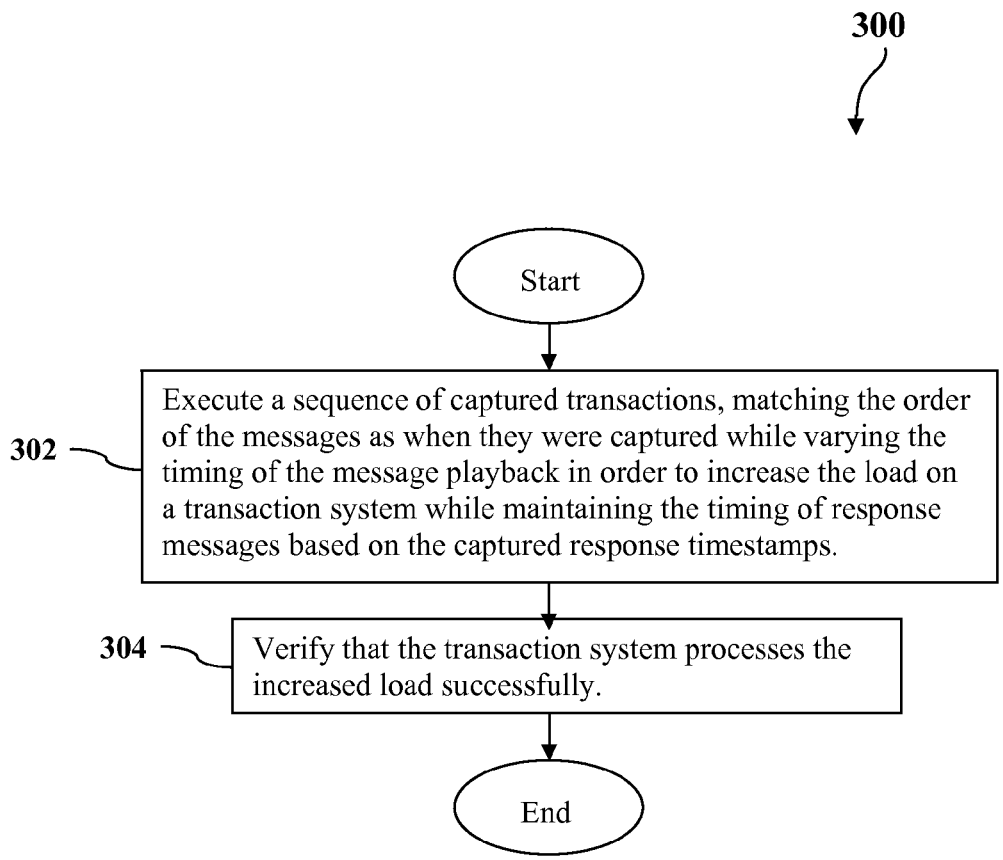
FIG. 4 is a flow chart of a method managing data communication network inventory according to an embodiment of the disclosure.

Turning now to FIG. 4, a method 300 of transaction load testing and performance optimization is described. At block 302, a sequence of captured transactions is executed, matching the order of the messages as when they were captured while varying the timing of the message playback in order to increase the rate of response messages based on the captured response timestamps. Increasing the speed of the message playback should result in a similar increase in the speed of the response messages, creating an increase in the transactions per second and increasing the load on the system required to handle the higher transaction rate. At block 304, it is verified that the enterprise service system 10 successfully processes the higher transaction rate. For example, the increased load due to timing changes is verified to not impact overall system performance. System performance may be monitored to verify the system remains stable under the increased load. For example, system resources may be checked to confirm processor and memory utilization thresholds are not reached. Message throughput may also be checked to verify delays are not introduced due the increased load.

In an embodiment, the method 300 further comprises emulating response messages with actual response times from the captured response. Emulating the response messages would allow reproduction of the transactions on the system without the need for connectivity to the backend systems such as data stores to supply the response messages. For example, it may not be desirable to conduct load testing and performance optimization on a production system handling live data, so a lab system with a similar configuration may be used. Rather than duplicating the production data stores in the lab environment, the captured response messages may be used to emulate the data stores, allowing equivalent functionality in the lab environment, maintaining the same responses with the same timing.

In an embodiment, the method 300 further comprises varying the timing of the response messages. Depending on the goals of the load testing and performance optimization, varying the timing of the response messages may allow different scenarios to be tested than when only varying the timing of the playback of the transactions messages. For example, testing could be done to see the effect on the system when the transaction messages are executed with the original timing, but the response messages are slowed down to introduce a delay. This could allow verification of how the system reacts to the delayed messages and whether the responses are linked to the correct transaction messages despite the delayed response.

In an embodiment, the method 300 further comprises rebuilding the captured configuration on separate hardware based on the stored configuration states and playing back the captured transaction messages on the separate hardware. As described above, it may be desirable to capture transactions in the production environment, but use separate lab systems for load testing and performance optimization. Utilizing the stored configuration states, the lab systems can be configured to match the production systems, allowing the lab systems to be used for playing back the captured transaction messages with the expectation of similar results to the production systems.

In an embodiment, the method 300 additionally comprises executing the captured transactions across a plurality of components based on capturing the number of components which originally processed the captured transactions. The number of components which processed the captured transactions may be determined by a list of hosts using a specified port to interact with the backend systems. A port is a communications endpoint used for addressing messages to the associated process or application when combined with an internet protocol address to form a destination address for a message. The load may be spread across the plurality of components to simulate the original environment through a load balancer which will equally divide the captured transactions among the plurality of components.

In an embodiment, the method 300 further comprises optimizing system performance based on the result of the playback of transactions. The playback of transactions provides a repeatable means of testing the system and looking at its performance. This allows changes to be made to the system, such as configuration, hardware, or software updates, with the ability to monitor the effect of the changes. Following a change, the playback of transactions may be repeated, verifying whether the change result in an optimized system performance. In an embodiment, optimizing system performance comprises identifying message delays and system improvements to reduce these delays. The ability to monitor components at several points and capture transaction messages and the timing of the messages allows for the identification of delays at various points in the system. By recognizing where delays are occurring, changes to improve the system performance in the area of the delay can be made. Captured transactions can then be executed after the changes to verify the message delays have been reduced and system performance is improved. The method 300 may also be used to forecast when an increasing transaction load may result in overloading the enterprise service system 10 and to plan for responding to the increased transaction load, for example planning for installing additional servers.

Figure 5:
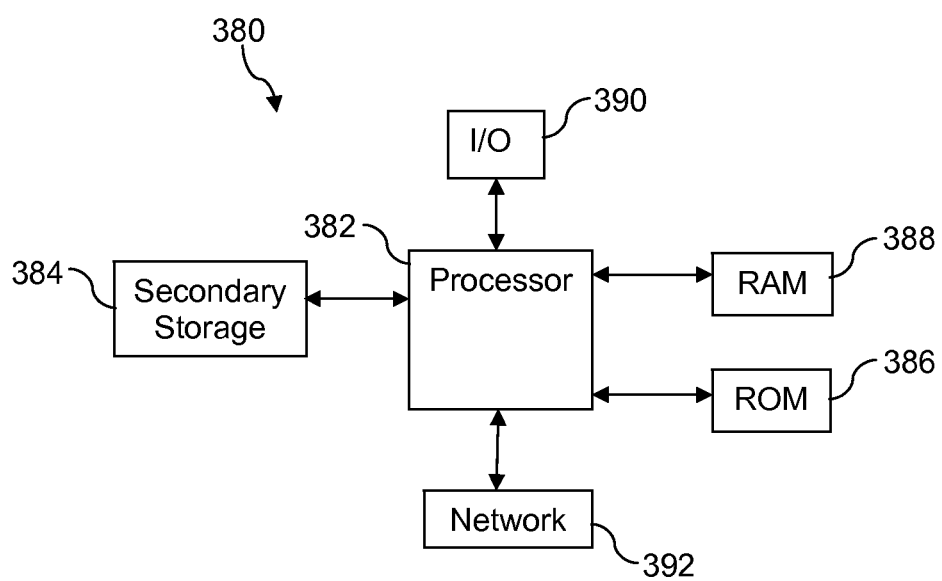
FIG. 5 illustrates an exemplary computer system suitable for implementing the several embodiments of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/ or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of computer transaction capture and playback, comprising:
identifying, by an application stored in a non-transitory memory and executed by a processor, monitored components of a transaction system, wherein the monitored components comprise one or more hardware platforms supporting an enterprise service oriented architecture;
capturing, by the application, a configuration of the transaction system by storing, by the application, configuration states of the monitored components;
capturing, by the application, transactions, which comprises capturing, by the application, transaction messages into and out of the monitored components, including timestamps and capturing, by the application, responses received from components not being monitored, including timestamps; and
executing, by the application, a sequence of transactions, in sequence and with the same timing as the captured transaction messages, to reproduce and monitor for failures.

2. The method of claim 1, wherein storing configuration states comprises copying the state of the hardware, data base schema, resource utilization and system logs to storage arrays.

3. The method of claim 1, wherein capturing transaction messages comprises copying the transaction messages with the time stamps, message headers and service payloads to storage arrays.

4. The method of claim 1, wherein the speed of transaction playback is varied to facilitate problem identification and troubleshooting.

5. The method of claim 1, further comprising using the stored configuration states of the monitored components to rebuild the captured configuration on separate hardware and playing back the captured transaction messages on the separate hardware.

6. The method of claim 5, further comprising emulating response messages with actual response times from the captured responses.

7. The method of claim 6, wherein the speed of response message playback is controlled to facilitate problem identification and troubleshooting.

8. The method of claim 5, wherein the separate hardware used to rebuild the captured configuration is located remotely.

9. The method of claim 5, wherein the stored configuration states and the captured transaction messages are encrypted.

10. The method of claim 1, wherein the enterprise service oriented architecture is implemented as a web service.

11. A method of computer transaction playback verification, comprising:
executing, by an application stored in a non-transitory memory and executed by a processor, a sequence of captured transaction messages within an enterprise service system, matching the order and timing of a plurality of captured messages based on the timestamps of the captured transaction messages;
monitoring, by the application, a plurality of state characteristics of components executing the captured transaction messages, wherein the components comprise one or more hardware platforms supporting an enterprise service oriented architecture;
verifying, by the application, the timing of the playback of the transactions and the timing of response messages compared to the timestamps captured;
identifying, by the application, a discrepancy between observed and captured timing or state characteristics; and
based on the identified discrepancy, determining a source of a problem in the enterprise service system.

12. The method of claim 11, wherein monitoring the state characteristics of the components comprises monitoring the configuration and resource utilization of the components.

13. The method of claim 11, wherein the sequence of captured transaction messages are started from a specific point in time for playback.

14. The method of claim 1, wherein the one or more hardware platforms comprise an application layer, an enterprise service bus, and one or more backend systems.

15. The method of claim 1, further comprising:
executing, by the application, another sequence of transactions, matching the order of the captured transaction messages as when they were captured while varying the timing of message playback in order to increase the load on a transaction system while maintaining the timing of the captured responses based on the captured response timestamps; and
verifying that the transaction system processes the increased load successfully.

16. The method of claim 15, further comprising emulating response messages with actual response times from the captured responses.

17. The method of claim 16, further comprising varying the timing of the response messages.

18. The method of claim 15, further comprising rebuilding the captured configuration on separate hardware based on the stored configuration states and playing back the captured transaction messages.

19. The method of claim 15, further comprising executing the captured transactions across a plurality of components based on capturing a number of components which originally processed the captured transactions.

20. The method of claim 19, further comprising optimizing system performance of the transaction system based on results of playback of the captured transactions, wherein optimizing system performance of the transaction system comprises identifying message delays and system improvements to minimize these delays.

* * * * *